(No Model.) 2 Sheets—Sheet 1.

E. M. NOLAN.
COTTON CHOPPER AND CULTIVATOR.

No. 489,640. Patented Jan. 10, 1893.

WITNESSES:
J. A. Criswell
C. Sedgwick

INVENTOR:
E. M. Nolan
BY Munn & Co
ATTORNEYS

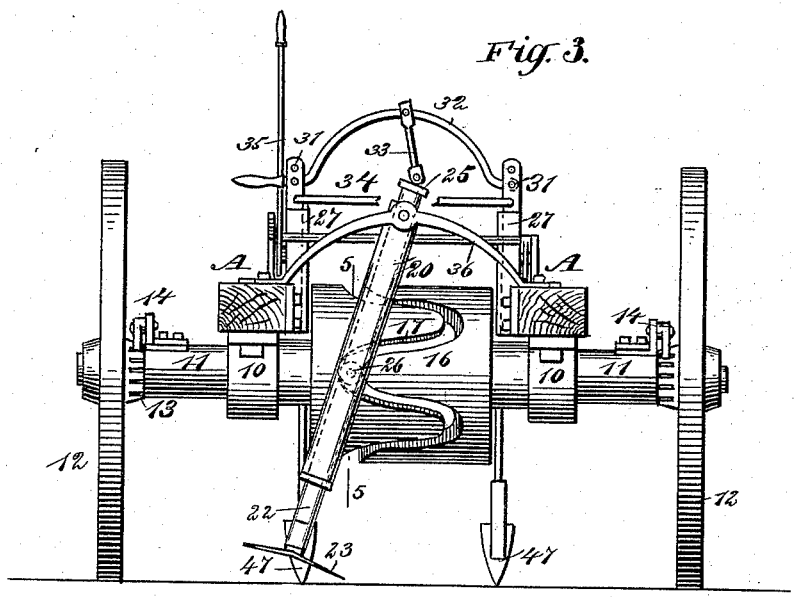

UNITED STATES PATENT OFFICE.

EUGENE M. NOLAN, OF JACKSONVILLE, FLORIDA.

COTTON CHOPPER AND CULTIVATOR.

SPECIFICATION forming part of Letters Patent No. 489,640, dated January 10, 1893.

Application filed December 3, 1891. Serial No. 413,902. (No model.)

*To all whom it may concern:*

Be it known that I, EUGENE M. NOLAN, of Jacksonville, in the county of Duval and State of Florida, have invented a new and Improved Cotton Chopper and Cultivator, of which the following is a full, clear, and exact description.

My invention relates to an improvement in cotton choppers and cultivators, and has for its object to construct the implement so that hoes will be carried in connection with cultivator blades, and so that both the hoes and the blades may be raised or lowered either independently or collectively.

Another object of the invention is to provide a novel means whereby two hoes may be made to operate conjunctively transversely of the implement and whereby as the implement advances the cut made upon the ground will be a diagonal one, and whereby after the first cut the rear hoe will cross diagonally the cut made by the forward hoe, thus producing a series of closely grouped, diamond-like spaces, in which spaces the cotton is left.

Another object of the invention is to construct the machine in a simple, durable and economic manner.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1:
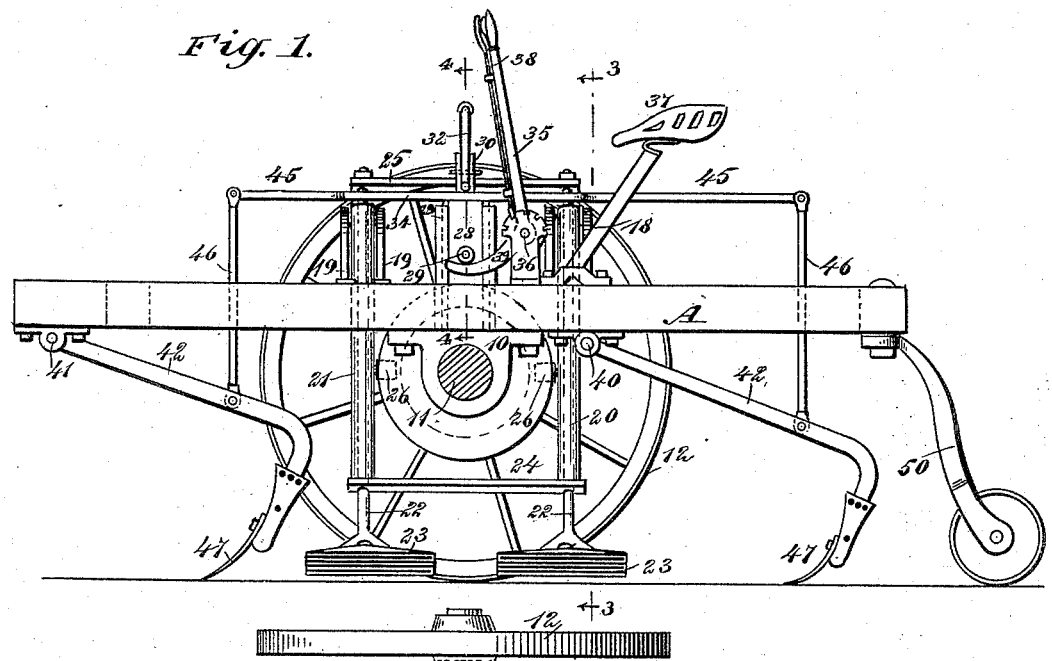
Figure 2:
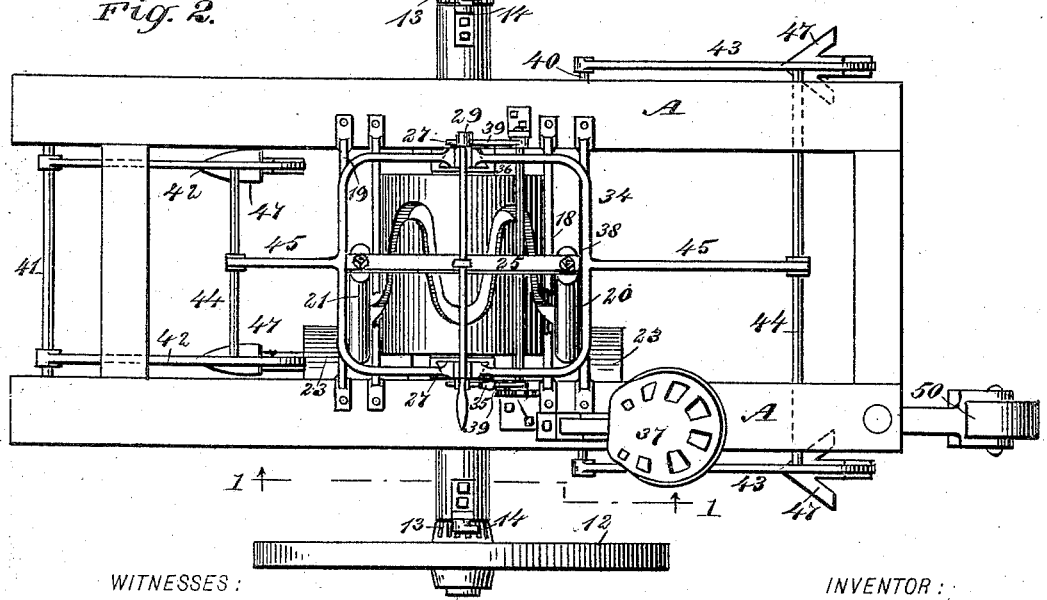
Figure 7:
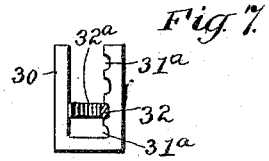

Figure 1 is a vertical section taken on the line 1—1 of Fig. 2, illustrating the major portion of the implement in side elevation; Fig. 2 is a plan view of the implement; Fig. 3 is a transverse elevation, taken practically on the line 3—3 of Fig. 1; Fig. 4 is a section taken substantially on the line 4—4 of Fig. 1, illustrating one of the lift blocks; Fig. 5 is a diametrical section taken through the drum carried by the axle and adapted to operate the hoes, the section being indicated by the line 5—5 in Fig. 3; and Fig. 6 is a diagrammatic view, illustrating the manner in which the cuts are made and the formation of the spaces between the cuts. Fig. 7 is a detail view of a bracket employed in connection with an adjusting lever.

The frame A of the implement is preferably made rectangular in general contour, and is provided with pedestals or hangers 10, in which an axle 11 is held to turn. The axle preferably extends ordinarily beyond the sides of the frame, and upon it wheels 12 are loosely mounted. The axle receives its movement from the wheels, the hubs of the latter upon their inner faces being provided with ratchet teeth 13 to be engaged by dogs 14, the latter being carried by the axle, as shown in Fig. 3. Upon the axle within the frame a drum 16, is securely fastened, which drum is provided with a peripheral cam groove 17, the said groove being endless. At each side of the drum two spaced brackets are located, the said brackets being secured to the frame, and the sets are designated in the drawings by the reference numerals 18 and 19. Between each set of brackets the upper end of a tube is pivoted, said tubes being designated as 20 and 21. In these tubes hoe handles 22, are loosely mounted, the said handles being capable of vertical movement in the tubes. The handles project above and below the tubes, and to the lower ends of the handles hoe blades 23, are secured. The lower ends of the tubes are connected by a cross bar 24, and the upper ends of the hoe handles are united by a cross bar 25.

Each tube 20 and 21, is provided upon its inner face with a pin having an attached friction roller 26; and these friction rollers travel in the cam groove 17 of the drum, whereby both hoes move in unison as the drum is revolved.

At opposite sides of the frame slide-ways 27, are constructed, and in said slide-ways lift blocks 28 have movement. Each block is provided upon its outer face with a friction roller 29, and at the upper end of each block a vertical bracket 30, is located, the brackets being secured to the blocks. The brackets are essentially U-shaped and are provided with a series of transverse apertures 31. In one bracket an end of an arched lever 32 is adjustably located, the pivotal connection being effected through the medium of a pin passed through the lever and the apertures in the bracket as shown in Fig. 3. The opposite bracket receiving the handle end of the lever may as shown in Fig. 7, be provided upon the inner face of one of its members with a series of notches 31ª, the lever being held in one of said notches by a spring 32ª secured to the lever and having a bearing against the smooth member of the bracket. By this means a quick movement of the lever may be effected to regulate the depth of the cut of the hoes. If preferred, however, the lever may be held in the bracket at its handle end by a pin as shown in the other figures. The lever 32 is connected by a link 33, with the central portion of the cross bar 25, uniting the hoe handles; and by raising or lowering this lever the hoe handles are carried in the same direction and the hoe blades consequently adjusted with reference to the ground in a manner to make a clean cut. A frame 34, preferably rectangular is located over the drum, being secured to the lift blocks 28. This frame is clearly shown in Fig. 2, and the frame is adapted for connection with the cultivator shanks preferably in a manner to be hereinafter described.

The frame 34, is raised whenever the lift blocks 28, are carried upward, and this latter operation is effected through the medium of a lever 35, attached to a shaft 36, journaled transversely above the main frame A, the said lever being convenient to the driver's seat 37, and provided with a thumb latch 38, engaging with a suitable rack. This shaft 36, is provided with two fingers 39, which fingers engage with the friction rollers 29 upon the lift blocks, and when the shaft is rotated in a certain direction the fingers are carried upward, and they carry the blocks 28 with them.

If in practice it is found desirable, racks and pinions together with a shaft having crank or lever attached may be employed as a substitute for the lift blocks, in which event the frame 34 and the brackets 30 will be attached to the top of the racks.

Shafts 40 and 41, are journaled, one near the center and the other near the end of the main frame A, beneath the latter; and to said shafts a forward and a rear set of cultivator shanks 42 and 43, are pivoted, the shanks being connected by suitable cross bars 44; and these cross bars are connected with arms 45, projected from the upper frame 34, by links 46, as shown in Fig. 1. The cultivator shanks have attached thereto any desired form of cultivator blades 47. Thus it will be observed that by the manipulation of the lever 35, both the cultivator shanks and the hoes may be elevated synchronically, and that the hoes may be adjusted independently of the cultivator shanks through the medium of the arch lever 32. It is also further evident that as the axle revolves, turning with it the drum 16, the hoes will be moved together transversely beneath the machine, making diagonal cuts at the same time that the machine advances. The form of these cuts is shown in Fig. 6, in which the heavy lines B indicate the movements of the front hoe, and the broken lines B', the movements of the rear hoe. When the implement starts the hoes move in the same direction, but when the next stroke is made the rear hoe crosses the stroke that has just been made by the forward hoe. This movement is repeated as long as the implement is in operation, and the result is that the cotton is left in small diamond-shaped spaces. By the use of two hoes cutting in the manner above described, it is evident that all of the weeds and plants desired to be removed will be effectually cleaned from the ground, as what may remain after the first cut will virtually be removed when that cut is crossed by a second.

The implement is exceedingly simple and durable, and if in practice it is found desirable the hoes and the drum may be entirely removed when the cotton has been properly thinned, and the cultivators only be used for working the cotton. In order that the frame may be kept at an even distance from the ground, a caster wheel 50, is preferably located at one corner, as illustrated in the drawings.

Having thus described my invention, I claim as new, and desire to secure by Letters Patent,—

1. In a cotton chopper or like implement, the combination, with the axle, supporting wheels mounted thereon, a driving connection between the wheels and axle, and a drum secured to the axle provided with a continuous, peripheral cam groove, of a hoe blade located at each side below the drum, handles attached to the blades, the upper ends of which are connected together and pivotally held, and pins connected with the hoe handles and traveling in the groove of the drum, one at each side of the latter, substantially as and for the purpose set forth.

2. In a cotton chopper or like implement, the combination with a rotating drum provided with a circumferential cam continuous groove, of tubes pivotally held at their upper ends, one located at each side of the drum, hoe handles held to slide in the tubes, pins projected from the tubes into the cam groove of the drum, a lift-lever, and a connection between the lift lever and the hoe handles, substantially as and for the purpose set forth.

3. In a cotton chopper or like implement, the combination, with the axle, supporting wheels mounted thereon, a driving connection between the wheels and axle, and a drum secured to the axle and provided with a continuous, peripheral cam groove, of tubes located one at each side of the drum and pivotally held at their upper ends, pins projected from the tubes into the grooves of the drum, hoe handles loosely held in the tubes, an adjustable lift lever, and a connection between the lift lever and the hoe handles, the connection being effected above the tubes in which the handles are located, as and for the purpose set forth.

4. In a cotton chopper or like implement, the combination, with the axle, supporting wheels mounted thereon, a driving connection between the wheels and the axle, a drum secured to the axle and provided with a continuous, peripheral cam groove, and tubes located one at each side of the drum, pivotally held at their upper ends and free to move at their lower ends, the said tubes being provided with pins entering the groove of the drum, of hoe handles loosely held in the tubes, lift blocks having sliding movement in the frame of the implement, a shaft operating to raise the lift blocks, cultivator shanks carried by the frame of the implement, a frame attached to the lift blocks and connected with the shanks, a lift lever adjustably connected with the lift blocks, a link connection between the lift lever and hoe handles, and a shifting lever connected with said shaft, as specified.

5. In a cotton chopper, the combination with a supporting frame, and a drum mounted therein and provided with a cam groove, of tubes pivoted in the frame and provided with pins working in the groove of the drum, hoe handles sliding in the tubes and connected together, a pivoted and adjustable lever and a link connecting the hoe handles with the said lever, substantially as described.

6. In a cotton chopper, the combination with a supporting frame, and pivoted cultivator shanks, of blocks sliding in ways on the supporting frame, a frame secured to the blocks and provided with forwardly and rearwardly projecting arms, links secured to the said arms and cultivator shanks, a shaft provided with fingers engaging the sliding blocks and a lever for operating the shaft, substantially as described.

7. In a cotton chopper, the combination with a supporting frame, hoe handles connected together and having a pivotal connection with the frame and means for operating the hoe handles, of blocks sliding in ways in the frame and provided with vertical brackets, a lever pivoted in one of the said brackets and having its other end adjustably held in the other bracket, a link connecting the hoe handles with the lever, a shaft provided with fingers engaging the sliding blocks, and a lever for operating the shaft, substantially as herein shown and described.

EUGENE M. NOLAN.

Witnesses:
GEORGE E. WILSON,
W. B. LEAKE.